United States Patent [19]

Klingelhofer et al.

[11] 4,103,964
[45] Aug. 1, 1978

[54] ADJUSTABLE HINGE ASSEMBLY FOR SEAT OF TWO-DOOR MOTOR VEHICLE

[75] Inventors: Friedrich Klingelhöfer; Heinz-Jürgen Wagener, both of Remscheid, Germany

[73] Assignee: Keiper K.G., Remscheid-Hasten, Germany

[21] Appl. No.: 744,176

[22] Filed: Nov. 22, 1976

[30] Foreign Application Priority Data

Nov. 25, 1975 [DE] Fed. Rep. of Germany ....... 2552787

[51] Int. Cl.$^2$ .......................... A47C 1/026; B60N 1/06
[52] U.S. Cl. .................................... 297/367; 297/379
[58] Field of Search ................ 297/379, 378, 366–371, 297/355, 354; 16/146

[56] References Cited

U.S. PATENT DOCUMENTS

| 3,727,978 | 4/1973 | Barriere et al. | 297/379 X |
| 3,880,464 | 4/1975 | Murphy et al. | 297/379 X |
| 3,966,253 | 6/1976 | Berghof et al. | 297/367 |
| 3,973,288 | 4/1976 | Pickles | 297/379 X |

FOREIGN PATENT DOCUMENTS

| 2,022,193 | 12/1971 | Fed. Rep. of Germany | 297/379 |
| 2,404,216 | 8/1975 | Fed. Rep. of Germany | 297/379 |

Primary Examiner—Roy D. Frazier
Assistant Examiner—William E. Lyddane
Attorney, Agent, or Firm—Michael J. Striker

[57] ABSTRACT

A hinge assembly for supporting the back part of a motor-vehicle seat on the fixed seat part comprises two hinges. Each of these hinges comprises a first hinge element pivotal on the seat part about a first axis between a rest position and a pivoted position and a second hinge element on the back part and pivotal on the respective first hinge element about a second axis through a plurality of angularly offset adjustment positions. Each second hinge element is provided with a plurality of teeth and each first hinge element has a pivotal pawl with teeth engageable with the teeth of the respective second element so as to hold the second element when these teeth are engaged in any of a plurality of angularly off-set adjustment positions. Mechanism is provided connected to both of these pawls for displacing the teeth thereof into and out of engagement with the respective teeth of the second formation. In addition a cam is provided which serves to lock out the adjustment means when the back part of the seat and the corresponding second hinge elements have been pivoted from the rest position, so that when the seat back has been pivoted forwardly the adjustment mechanism cannot be operated to maladjust the seat.

12 Claims, 5 Drawing Figures

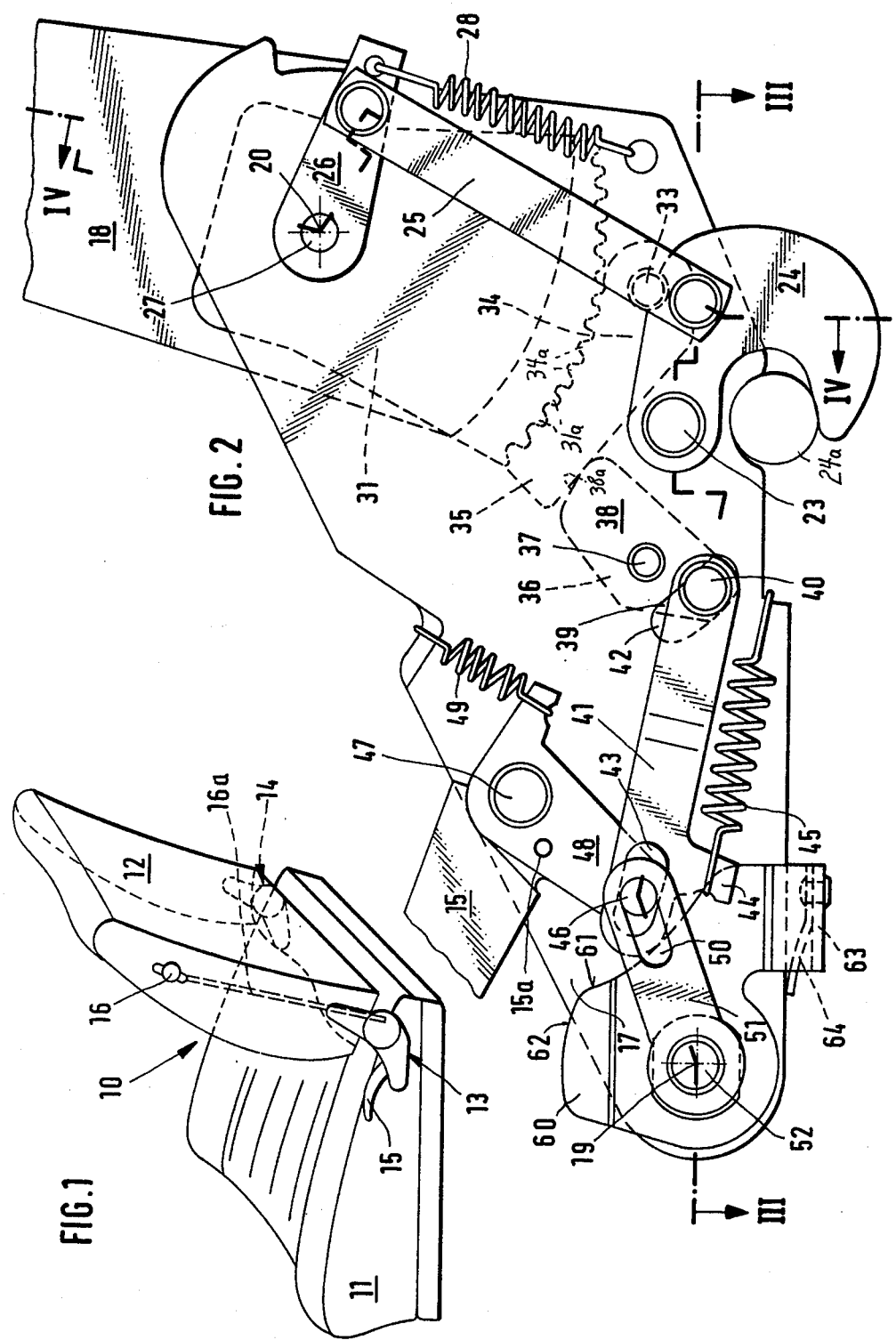

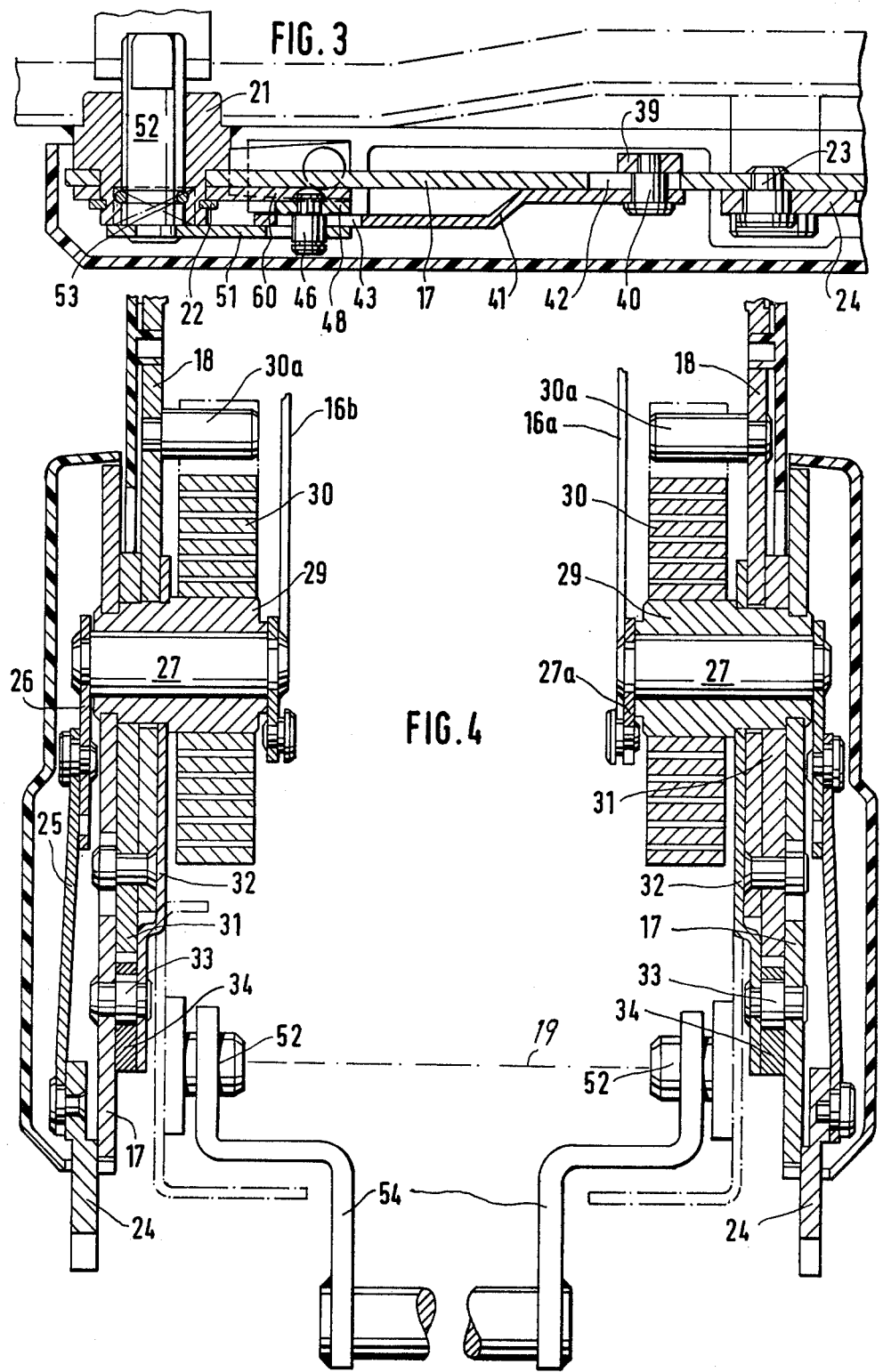

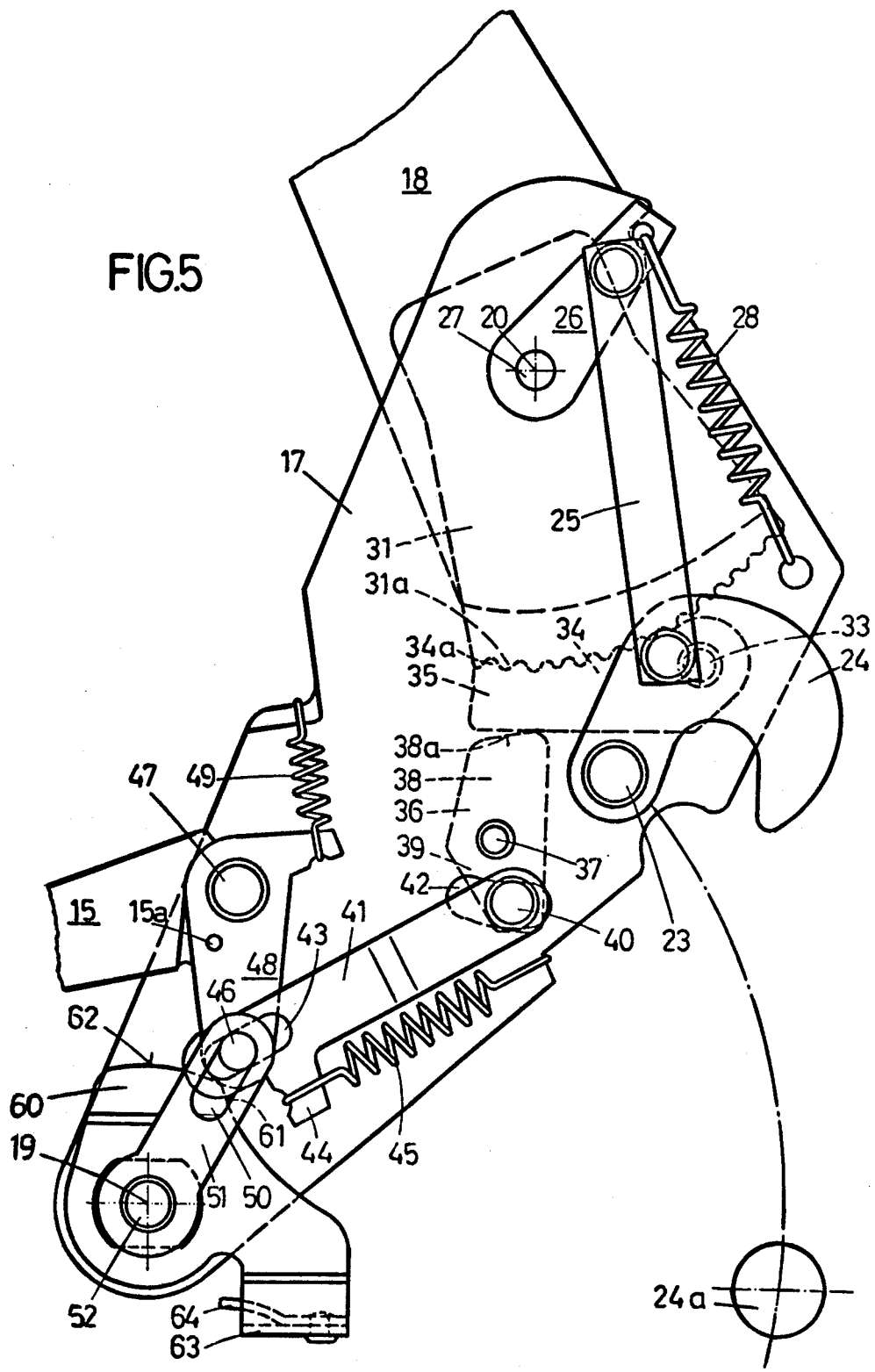

ADJUSTABLE HINGE ASSEMBLY FOR SEAT OF TWO-DOOR MOTOR VEHICLE

BACKGROUND OF THE INVENTION

The present invention relates to a hinge. More particularly this invention concerns an adjustable hinge assembly for mounting the movable back part on the fixed seat part of an automotive-vehicle seat.

In a two-door automotive vehicle it is necessary to pivot the back part of each of the front seats forwardly in order to gain access to the back seat of the vehicle. To this end the back part is connected via a hinge assembly to the seat part of the motor-vehicle seat.

Federal regulations now require that the back part not be pivotal relative to the seat part except during actuation of a release mechanism which normally locks the back part relative to the seat part. This safety feature prevents a passenger or object in the back seat from being thrown against the back part of the front seat during a collision or sudden braking maneuver and pivoting the back part of the front seat forwardly, thereby injuring the front-seat passenger.

In addition it is normally considered necessary to make the back part of the motor-vehicle seat adjustable relative to the seat part, at least with respect to the inclination of the back part relative to the seat part, Thus adjustment mechanism is provided between these two parts which allows the back part to assume any of a plurality of angularly offset rest positions relative to the seat part. Thus, the user can adjust the back part of the seat for the inclination desired.

It is therefore necessary that a motor-vehicle seat hinge assembly permit displacement of the back part forward relative to the front part to gain access of the motor vehicle while simultaneously allowing adjustment of the rest position of the back part. Since it is obviously undesirable to have to readjust the rest position of the back part each time it is released and pivoted forward for access to the rear seat, these two functions are normally separate. This can most easily be effected by interconnecting the two seat parts by means of a hinge assembly having two parts which can rotate relative to each other and be fixed in any of a plurality of adjustment positions for establishment of the rest position of the back part. Furthermore, both seat elements are jointly pivotal about another axis which is normally offset from the firstmentioned axis so as to allow pivoting of the back part of the seat forwardly after release of the holding mechanism that normally prevents such forward pivoting. Thus, such a hinge assembly is normally relatively complex and prone to failure.

Another disadvantage of the above-described type of hinge assembly is that the adjustment lever which is actuatable to allow changing of the rest position of the back part relative to the seat part is frequently actuated during pivoting-forward of the back part, so that the seat becomes maladjusted. It has been suggested to overcome this difficulty by mounting the seat-adjustment lever at a distance from the seat hinge and providing mechanism to connect the seat-adjustment lever with the adjustment mechanism in the hinge, but such attempts have only greatly complicated the overall structure. Furthermore, during entry into and exiting from the rear seat the passenger very frequently must scramble over the front seat and, no matter where the adjustment lever is positioned, it runs the risk of being actuated.

SUMMARY OF THE INVENTION

It is therefore an object of the present invention to provide an improved hinge.

Another object is to provide an improved hinge assembly for mounting the back part onto the fixed seat part of a motor-vehicle seat.

Yet another object is to provide such a hinge assembly which is relatively simple, yet which overcomes the above-given disadvantages.

These objects are attained according to the present invention in a hinge assembly comprising a support, a first hinge element pivotal on the support about a first axis between a rest position and a pivoted position angularly offset from the rest position, a second hinge element pivotal on the first hinge element about a second axis through a plurality of angularly offset adjustment positions, and interengageable formations on the first and second elements relatively displaceable between an engaged position wherein the second element is fixed relative to the first element in any of the adjustment positions and a disengaged position wherein the second element is freely pivotal relative to the first element about the second axis. Adjustment means is connected to the formations for displacing these formations between the engaged and disengaged positions, and lockout means is provided between the support and the adjustment means for preventing displacement of the formations into the disengaged position except when the first element is in its rest position.

Although the first and second axes may be coaxial, according to a further feature of this invention these axes are parallel and offset from each other. The assembly further comprises means on the support for locking the first element in the rest position.

Two such hinge assemblies are used according to this invention on a motor-vehicle seat, with the first hinge elements each pivotal on the seat part and the second hinge element each pivoted on the back part. These hinge elements are spaced axially from each other, but the first axes of both first hinge elements are coaxial as are the second axes between each first element and the respective second element. A set of interengageable formations is provided on each hinge constituted by a first and second element. Each set of formations includes an arcuate array of teeth on the second element and centered on the second axis, and another arcuate array of teeth carried on a pawl pivoted on the first element and constituting part of the adjustment means.

According to yet another feature of this invention the lockout means includes a cam carried on the support or seat part and having a portion which is engageable with a pivotal adjustment lever that must be swung from a normal position in order to move the interengageable formation via the adjustment means into the disengaged position. This cam prevents pivoting of this lever except when the first hinge element is in the rest position, so that once the seat back is pivoted even slightly forward it becomes impossible to actuate the adjustment mechanism, thereby preventing inadvertent maladjustment of the seat.

According to yet another feature of this invention each of the hinges is mounted on a sleeve fixed in the support or seat part and defining the first axis. The cam is fixed around the sleeve and constitutes a plate carried directly on the seat part and having an edge coacting with the adjustment mechanism as described above. The adjustment mechanisms of each of the hinges are connected together via a link rod extending between the two axially spaced hinges along the first axis and extending through each of the sleeves. The plate constituting the lockout cam has a bent over tab provided with a spring that defines the rest position for the first hinge element and prevents rattling of the assembly.

According to yet another feature of this invention both adjustment means include lost-motion couplings, so that only after predetermined travel of the single adjustment lever are these adjustment means effective to pull the respective pawls out of engagement with the array of teeth on the second hinge element. Furthermore, the means for urging the pawl into engagement with the corresponding array of teeth on the second hinge element is a pivotal arm capable of pressing the pawl with no play into the teeth of the second hinge element. This feature in combination with the lost-motion coupling assures that once adjusted the back part of the motor vehicle seat will be rigidly connected to the fixed seat part.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWINGS

FIG. 1 is a perspective view of a motor-vehicle seat according to the present invention;

FIG. 2 is a side view of a hinge assembly in accordance with this invention, parts being removed for a clarity of view;

FIGS. 3 and 4 are sections taken along lines III—III and IV—IV of FIG. 2, respectively; and FIG. 5 is a side view similar to FIG. 2 illustrating the hinge assembly in the actuated position.

SPECIFIC DESCRIPTION OF A PREFERRED EMBODIMENT

As shown in FIG. 1 a motor-vehicle seat 10 for a two-door motor vehicle has a fixed seat part 11 connected to a back part 12 by means of a pair of hinges 13 and 14. A lever 15 is provided at one of the hinges for adjustment of the inclination of the back part 12 relative to the seat part 11 and a release button 16 is provided to allow the back part 12 to be pivoted forwardly.

As shown in more detail in FIGS. 2-4 the hinge 13, which is mirror-symmetrical to the hinge 14, comprises a first hinge plate 17 and a second hinge plate 18. The first hinge plate 17 is pivotable about a horizontal axis 19 on the support constituted by the motor-vehicle seat part 11 and the second part 18 is pivotal about an axis 20 on the first part 17. The axis 19 is defined by a sleeve 21 (FIG. 3) fixed to the seat part 11 and fitted with a snap ring 22 that holds the first hinge plate 17 in place thereon, while leaving it pivotal about the axis 19.

The plate 17 is provided with a pivot pin 23 defining a pivot axis parallel to the axes 19 and 20 and pivotally carrying a hook 24 engageable over a pin 24a carried on the seat part 11. A link 25 connects this hook 24 to a pivotal arm 26 carried on a pin 27 defining the axis 20 and rotationally linked to the arm 26. Thus pivoting of the pin 27 in a counterclockwise direction as viewed in FIG. 2 will pull the hook 24 away from the pin 24a. A helical tension spring 28 is engaged between the outer end of the arm 26 and the plate 17 and normally biases the arm 26 in a clockwise direction so as normally to hook the pin 24a.

As better shown in FIG. 4 the pin 27 is pivotal within a sleeve 29 fixed to the plate 17 and concentric to the axis 20. The end of the pin 27 opposite the arm 26 carries an arm 27a connected in the hinge 13 to a rod 16b and in the hinge 14 to a rod 16a connected to the button 16. It is noted that it is possible to provide a single pin 27 extending all the way through the seat back 12 for operation of both of the hooks 24 by means of a single button 16 attached to the end of, for instance, the rod 16a.

A heavy-duty torsion spring 30 has one end fixed to the sleeve 29 and another end fixed to a pin 30a carried on the second hinge plate 18. This spring 30 is tensioned so as normally to pivot the hinge plate 18 counterclockwise as seen in FIG. 2 or forwardly as seen in FIG. 1 relative to the plate 17. As the hinge part 18 is pivoted counterclockwise on the pivot axis 20 relative to the respective plate 17 the spring force resisting such pivoting increases.

The lower end 31 of the plate 18 is formed with an arcuate array of teeth 31a having a center of curvature lying on the axis 20. In addition the plate 17 is provided with a pawl 34 pivoted about an axis 33 parallel to the axes 20 and 19 on this plate 17. This pawl 34 has an upper end 35 formed with a plurality of teeth 34a that are meshable with the teeth 31a. In addition the hinge part 17 carries an actuating member 36 pivoted about an axis 37 parallel to the axes 19 and 20 on the plate 17. This part has one end 38 engageable with the back of the pawl 34 and another end 39 carrying a pin 40 extending through a slot 42 in the plate 17 and connected on its other end to one end of a link 41. The end surface 38a of the dog or plate 36 extends at an angle to a center line of the element 36 through the pin 37 so that it can press the pawl 34 tightly against the array of teeth 31a.

The link 41 is provided at its end opposite the pin 40 with a slot 43 in which engages a pin 46. In addition this link 41 is provided with a laterally extending tab 44 over which is hooked a tension spring 45 that normally pulls the link 41 in a direction tending to move the element 36 counterclockwise and press the face 38a against the back of the pawl 34.

The pin 46 is carried on a plate or member 48 pivotal about a pin 47 along with the adjustment lever 15 and pivotally connected to this adjustment lever 15 by means of a rivet 15a. A spring 49 is hooked over the adjustment member 48 and normally urges it and the lever 15 in a counterclockwise direction.

The pin 46 also engages in an elongated slot 50 formed in an arm 51 carried on a pin 52 that extends along the first axis 19 through the sleeve 21. The other end of this pin 52 is connected via the link rod 54 to the pin 52 of the other hinge 14 for joint rotation of these two pins 52 about the common axis 19.

In addition the hinge 13, and if desired the hinge 14, is provided with a cam plate 60 mounted on the sleeve 21 and having a first cam surface 61 having a center of curvature lying on the axis of pin 47 and a bent-over end forming a second camming surface 62. These surfaces 61 and 62 are so constructed that it is impossible to pivot the lever 48 from the position illustrated in FIG. 2 whenever the two hinge parts 17 and 18 are pivoted up away from the pin 24a about the axis 19. In the position illustrated in FIG. 2 it is possible for the pin 46, which would otherwise engage the surfaces 61 and 62, to pivot freely about the axis 47. The plate 60 also has a bent-over tab 63 provided with a leaf spring 64 that bears against the bottom of the plate 17 in the illustrated rest position of the hinge 13. This spring 64 prevents rattling of the hinge.

Under normal circumstances the parts of the hinges 13 and 14 assume the position shown in FIG. 2. In order to pivot the seat back 12 forwardly the button 16 is raised so as to pivot the pin 27 and pull the hook 24 away from the pin 24a. Once the two hooks 24 are clear of their respective pins 24a it is possible to pivot the entire seat back 12 forwardly onto the seat part 11 in order to gain access to the rear seat of the vehicle.

In the rest position illustrated in FIG. 2 it is also possible to adjust the relative inclination between the parts 11 and 12 of the seat 10 by lifting the lever 15. Such lifting of the lever 15 pulls the pin 46 to the left in the slot 43 simultaneously pivoting the lever 51 in a counterclockwise direction. This will cause both of the pins 52 to rotate, so that the arm 51 on the hinge 14 will also swing up in a counterclockwise direction. The hinge 14 is provided with a plate 48 and pin 46, but with no adjustment lever 15. Once the pin 46 comes to the far left of the two links 41 further lifting of the lever 15 will cause both of the links 41 to move to the left or forwardly on the plates 17. This will cause the respective plates 36 to pivot in a clockwise direction as shown in FIG. 2 away from the backs of the respective pawls 34, allowing the teeth 31a and 34a to disengage. As soon as they are disengaged the springs 30 will push the seat back 12 forwardly with a slight force so that the user need merely move his back into the desired position, the seat back 12 automatically pressing against him.

Once the desired position is obtained the user need merely release the lever 15. The springs 49 and 45 will automatically cause the mechanism to return to the position in FIG. 2 so that the teeth 31a and 34a will reengage. The various lost-motion couplings, such as constituted by the pin 46 in the slot 43, will allow the teeth to engage in each hinge when the proper position has been assumed, nonengagement on one side not necessarily preventing engagement of the teeth on the other side. Even if only one side engages as soon as the user leans against the seat the released plate 36 will automatically cause the pawl 34 of the disengaged side to engage as soon as the teeth 31a and 34a are aligned.

When, however, the seat back 12 is flipped forwardly by disengagement of the hooks 24 from the pins 24a and the plate 17 is pivoted upwardly about the axis 19 relative to the cam 60, it becomes impossible to pivot the plate 48 about the axis 47. This is due to the interaction of the cam surfaces 61 and 62 and this pin 46, as these surfaces will not allow clockwise pivoting of the plate 48 whenever the plate 17 is out of the position illustrated in FIG. 2 relative to the nonrotatable cam 60. Thus, once the seat has been pivoted forward as shown in FIG. 5 it is impossible to inadvertently operate the lever 15 and change the adjustment of the rest position of the seat.

The hinges 13 and 14 described above can be produced at relatively low cost. The various plates 17 and 18 can be simple stampings, and their alignment can be assured by means of a plate 32 (FIG. 4) riveted to the plate 17 and preventing the plate 18 from moving relative to the plate 17. The various parts need not be produced with extremely high tolerances since the lost-motion coupling allows actuation of one hinge 13 before or after actuation of the other hinge 14 to be compensated for readily.

It will be understood that each of the elements described above, or two or more together, may also find a useful application in other types of hinge assemblies differing from the types described above.

While the invention has been illustrated as described as embodied in a hinge for adjustable motor-vehicle seat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A hinge assembly comprising:
   a support;
   a first hinge element pivotal on said support about a tipping axis between a rest position and a pivoted position angularly offset therefrom;
   a second hinge element pivotal on said first hinge element about an adjustment axis through a plurality of angularly offset adjustment positions;
   respective first and second interengageable formations on said first and second elements relatively displaceable between an engaged position wherein said second element is fixed relative to said first element in any of said adjustment positions and a disengaged position wherein said second element is freely pivotal relative to said first element about said adjustment axis;
   adjustment means including an adjustment member connected to one of said formations and displaceable between a normal position and an actuated position for displacing said one formation and thereby relatively displacing said formations between said engaged and disengaged positions, respectively; and
   lockout means including an abutment mounted on one of said elements and operatively engageable with said adjustment member for preventing displacement of said adjustment member into said actuated position except when said first element is in said rest position.

2. The assembly defined in claim 1 wherein said axes are parallel and offset from each other, said assembly further comprising means on said support for locking said first element in said rest position.

3. The assembly defined in claim 2 wherein said abutment is engageable with said adjustment means only in said pivoted position of said first element.

4. The assembly defined in claim 2, wherein said means for locking said first element in said rest position includes a release element separate and independent of said adjustment member and displaceable to release said first element for displacement into said pivoted position.

5. The assembly defined in claim 2, wherein said formation of said second hinge element is an array of teeth centered on said adjustment axis and said adjustment means includes a pawl pivotal on said first element and formed with an arcuate array of teeth constituting the other formation and meshable with the teeth of said second element.

6. A hinge assembly for supporting the back part of a motor vehicle seat on the fixed seat part, said assembly comprising:
two first hinge elements each pivotal on the seat part about a tipping axis between a rest position and a pivoted position angularly offset therefrom;
two second hinge elements on the back part and each pivotal on a respective first hinge element about an adjustment axis through a plurality of angularly offset adjustment positions;
a set of interengageable respective first and second formations on said first and second elements, each set relatively displaceable between an engaged position wherein the respective second element is fixed relative to the respective first element in any of said adjustment positions and a disengaged position wherein the respective second element is freely pivotal relative to the respective first element about said adjustment;
adjustment means including a respective adjustment member connected to one of said formations of each of said sets and displaceable between a normal position and an actuated position for displacing the respective said one formation and thereby displacing the respective set of said formations between said engaged and disengaged positions, respectively; and
lockout means between the seat part and said adjustment means and including an abutment on one of said first and second elements and operatively engageable with said adjustment member for preventing displacement of said adjustment member into said actuated position except when said first elements are in said rest position.

7. The assembly defined in claim 6, wherein said adjustment member is an adjustment lever pivoted on said first element and having a member moving from a normal position on displacement of said formations from said engaged position, said lockout means including a cam having said abutment and engageable with said member to prevent displacement of same from said normal position except when said first element is in said rest position.

8. The assembly defined in claim 7 wherein said cam is mounted fixedly on said seat part and said adjustment means includes a link rod extending between one of said first elements and the other of said first elements.

9. The assembly defined in claim 8 wherein said cam is a plate fixed to said seat part.

10. The assembly defined in claim 7 wherein said cam carries a portion engageable with said first element in said rest position and at least partially defining said rest position.

11. The assembly defined in claim 8 wherein the seat part is provided with a nonrotatable sleeve at each of said first elements centered on said first axis and defining same, said link rod extending through said sleeves and said cams being fixedly mounted on one of said sleeves.

12. The assembly defined in claim 8 wherein said adjustment means includes a pawl pivotal on each of said first elements, said sets of formations each including an arcuate array of teeth on the respective second element and an arcuate array of teeth on the respective pawl meshable with the array on the respective second element.

* * * * *